(12) United States Patent
Rajagopal et al.

(10) Patent No.: US 11,380,305 B2
(45) Date of Patent: Jul. 5, 2022

(54) SYSTEM AND METHOD FOR USING A QUESTION AND ANSWER ENGINE

(71) Applicant: Accenture Global Solutions Limited, Dublin (IE)

(72) Inventors: Vidya Rajagopal, Bangalore (IN); Marin Grace Mercylawrence, Bangalore (IN); Gaurav Mengi, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 226 days.

(21) Appl. No.: 16/715,819

(22) Filed: Dec. 16, 2019

(65) Prior Publication Data

US 2020/0227026 A1 Jul. 16, 2020

(30) Foreign Application Priority Data

Jan. 14, 2019 (IN) .............................. 201941001611

(51) Int. Cl.
*G10L 15/06* (2013.01)
*G06N 5/04* (2006.01)
(Continued)

(52) U.S. Cl.
CPC .......... *G10L 15/063* (2013.01); *G06F 16/244* (2019.01); *G06F 16/285* (2019.01);
(Continued)

(58) Field of Classification Search
CPC .................. G10L 15/063; G10L 15/08; G10L 2015/0631; G10L 2015/088; G06N 5/043;
(Continued)

(56) References Cited

U.S. PATENT DOCUMENTS 7,836,061 B1 * 11/2010 Zorky ................... G06F 16/353
 707/749
2007/0150812 A1 * 6/2007 Hu ......................... G06Q 10/10
 715/705

(Continued)

FOREIGN PATENT DOCUMENTS

EP 3680802 A1 7/2020
WO 2018/077655 A1 5/2018

OTHER PUBLICATIONS

Extended European Search Report dated Jun. 9, 2020 for European Patent Application No. 20151531.9.
(Continued)

*Primary Examiner* — Samuel G Neway
(74) *Attorney, Agent, or Firm* — Plumsea Law Group, LLC

(57) ABSTRACT

A system and method for using, training, building, and managing a question and answer engine to automatically generate responses to an end-user is disclosed. Specifically, the method and system make use of a topic builder that uses cluster predictions to generate and identify a list of topics and subtopics. A question and answer database may then be sorted by topic and subtopic using a similarity scorer. New user utterances may be analyzed to identify questions, with a cluster predictor identifying the corresponding topic and subtopics for each question, and a similarity scorer may identify the closest known question for the user's question to a recommender as an answer. Analytics of new user utterances are tracked to update the historical utterance database and question and answer database, thus allowing continuous improvement of the engine.

20 Claims, 10 Drawing Sheets

(51) Int. Cl.
*G10L 15/08* (2006.01)
*G06F 16/28* (2019.01)
*G06F 16/35* (2019.01)
*G06F 16/332* (2019.01)
*G06F 16/242* (2019.01)

(52) U.S. Cl.
CPC ........ *G06F 16/3329* (2019.01); *G06F 16/355* (2019.01); *G06N 5/043* (2013.01); *G10L 15/08* (2013.01); *G10L 2015/0631* (2013.01); *G10L 2015/088* (2013.01)

(58) Field of Classification Search
CPC .... G06F 16/3329; G06F 16/285; G06F 16/35; G06F 16/355; G06F 16/244
See application file for complete search history.

(56) References Cited

U.S. PATENT DOCUMENTS

| | | | | |
|---|---|---|---|---|
| 2009/0077066 | A1* | 3/2009 | White | G06F 16/217 |
| 2009/0150436 | A1* | 6/2009 | Godbole | G06F 16/355 |
| 2009/0306967 | A1* | 12/2009 | Nicolov | G06Q 30/02 |
| | | | | 704/9 |
| 2010/0153094 | A1* | 6/2010 | Lee | G06F 16/3329 |
| | | | | 704/9 |
| 2015/0066479 | A1* | 3/2015 | Pasupalak | G06F 40/40 |
| | | | | 704/9 |
| 2016/0034757 | A1* | 2/2016 | Chhichhia | G06K 9/6219 |
| | | | | 382/206 |
| 2016/0147891 | A1* | 5/2016 | Chhichhia | G06F 16/986 |
| | | | | 707/734 |
| 2016/0232221 | A1* | 8/2016 | McCloskey | G06F 16/3329 |
| 2019/0087455 | A1* | 3/2019 | He | G06F 40/253 |
| 2019/0102390 | A1* | 4/2019 | Antunes | G06F 40/295 |
| 2019/0205391 | A1* | 7/2019 | Dobrynin | G06F 16/245 |
| 2019/0356562 | A1* | 11/2019 | Watkins | G06F 9/547 |
| 2020/0050636 | A1* | 2/2020 | Datla | G06N 5/04 |
| 2020/0218744 | A1* | 7/2020 | Wang | G06K 9/6228 |
| 2020/0227026 | A1* | 7/2020 | Rajagopal | H04L 51/02 |

OTHER PUBLICATIONS

Zhou et al., "A Classification-based Approach to Question Routing in Community Question Answering", Proceedings of the 21st International Conference Companion on World Wide Web, WWW '12 Companion, 2012, p. 783, XP055699492, New York, New YOrk, USA.

Anonymous: "Latent Semantic Analysis—Wikipeida", Nov. 6, 2018, XP055699464, retrieved from the Internet: URL: https://de.wikipedia.org/w/index.php?title=Latent_Semantic_Analysis&oldid=182518896 [retrieved on May 28, 2020].

Bernardo Magnini et al.: "Integrating Subject Field Codes into WordNet", LREC 2000, 2000, XP055699449.

* cited by examiner

SYSTEM AND METHOD FOR USING A QUESTION AND ANSWER ENGINE

TECHNICAL FIELD

The present disclosure generally relates to question and answer engines. More specifically, the present disclosure generally relates to training question and answer engines to interact with end-users as well as training question and answer engines for reference by virtual agents.

BACKGROUND

The functionality provided by today's electronic devices is increasing rapidly, as many consumer devices, such as smartphones, tablets, laptops, and other devices are able to run software applications to perform various tasks and provide different types of information. An intelligent automated assistant, also referred to herein as a virtual assistant or chatbot, can provide an improved interface between a human and computer. Such an assistant allows users to interact with a device or system using natural language, in spoken and/or text forms. For example, a virtual assistant can be configured as an easy-to-use interface that receives and interprets user inputs, operationalizes the user's intent into tasks and parameters to those tasks, executes services to support those tasks, and produces output that is intelligible to the user.

Informally, virtual agents may be referred to as "chatbots" or more simply "bots". Virtual agents may be used by corporations to assist customers with tasks such as answering user questions. Using virtual agents may offer a corporation advantages by reducing operational costs of running call centers and improving the flexibility with which a company can increase the number of available agents that can assist customers.

The capacity of a virtual assistant to be able to respond to a client query, and the extent to which the response adequately and appropriately resolves a query, often depends on the knowledge base and programmed competences of the virtual assistant. In particular, virtual assistants generally operate by applying programmed rules when responding to user queries. These rules determine the scope of queries that may be addressed by the virtual assistant, and the depth of the response that is provided.

While the presence of virtual assistants in society is growing rapidly, its functionality remains limited, particularly in customer service contexts. For example, existing models used to train chatbots suffer from several flaws. First, most require extensive user intervention, for example, requiring a user to manipulate a graphical user interface to assemble their queries and respective answers. Second, conventional models are effectively "black boxes" being hosted on remote servers run by third party companies. Black box-type models can be overly generic, whereby end-users are unable to personalize improve the system over iterations, with the service provider tuning the conventional model to their general purpose modeling rather than customizing for each customer. Furthermore, the users must submit their data via such conventional models, thereby placing large amounts of sensitive information at the disposal of third-party companies, increasing the risk of data breaches. Third, existing models can only respond to preset variations, and often have a limited number of variants, resulting in user frustration when queries are not phrased within the narrow preset range. Fourth, the process of building a question and answer response system is long and repetitive, as users must anticipate the nature of each question, as well as the variants of phrasing, requiring a long and tedious build of question by question and answer by answer. Fifth, existing systems must consult the entire database at once, increasing the computational burden and time required to answer.

There is a need in the art for a system and method that addresses the shortcomings discussed above.

SUMMARY

A system and method for using a question and answer engine to interact with an end-user is disclosed. The question and answer engine may include a topic builder to identify topics in a historical utterance database, a question and answer builder to sort a master question and answer database by topic, a predictor to identify questions in new user utterances and identify the appropriate response, a recommender to provide the response to the user, an analytic data collector to track the answers and response in real time, and a trainer to use the real time data to update the databases and train the model.

The disclosed system and method provide several advantages over existing systems and methods. For example, clustering new user utterances into a topic and subtopic significantly reduces computational load and increases processing speed. More specifically, instead of comparing each new question with an entire database of previous questions, only the questions in an identified topic and subtopic are compared. This allows for the system and method to increase the computational speed. Furthermore, the disclosed system and method provide for iterative learning by tracking questions asked and improving the system in real time, allowing for continuous refinement, and continuous improvement of response quality, search time, and system speed.

In some aspects, the disclosure provides a method for using a question and answer engine to automatically generate responses to an end-user. The method can include classifying each utterance stored in a historical utterance database under at least one topic and at least one subtopic, and classifying each of a plurality of questions and corresponding answers stored in a question and answer database under at least one topic and at least one subtopic. In addition, the method includes receiving a first user utterance and determining that the first user utterance is associated with a first topic and a first subtopic. Furthermore, the method includes identifying a list of questions similar to the first user utterance stored in the question and answer database by applying a similarity scorer to the first user utterance, the list including a first question and a corresponding first answer, and automatically generating a first response to the first user utterance based on the first answer.

In another aspect, the disclosure provides a system for using a question and answer engine to automatically generate responses to an end-user. The system includes a processor and machine-readable media including instructions which, when executed by the processor, cause the processor to classify each utterance stored in a historical utterance database under at least one topic and at least one subtopic, and to classify each of a plurality of questions and corresponding answers stored in a question and answer database under at least one topic and at least one subtopic. The instructions also cause the processor to receive a first user utterance and determining that the first user utterance is associated with a first topic and a first subtopic, identify a list of questions similar to the first user utterance stored in the question and answer database by applying a similarity scorer to the first user utterance, the list including a first question and a corresponding first answer, and automatically generate a first response to the first user utterance based on the first answer.

In yet another aspect, the disclosure provides a non-transitory computer-readable medium storing software comprising instructions executable by one or more processors which, upon such execution, may cause the one or more processors to classify each utterance stored in a historical utterance database under at least one topic and at least one subtopic, and to also classify each of a plurality of questions and corresponding answers stored in a question and answer database under at least one topic and at least one subtopic. The instructions further cause the one or more processors to receive a first user utterance and determining that the first user utterance is associated with a first topic and a first subtopic, identify a list of questions similar to the first user utterance stored in the question and answer database by applying a similarity scorer to the first user utterance, the list including a first question and a corresponding first answer, and automatically generate a first response to the first user utterance based on the first answer.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

A system and method for training a question and answer engine to interact with an end-user is disclosed. As discussed in more detail below, the system and method can be used to help chatbots provide responses to frequently asked questions (FAQs). The system and method categorize user utterances, provide recommendations for responding to the user utterances, and can be configured to further refine the answers that will be generated based on the user's utterances and responses.

Figure 1:
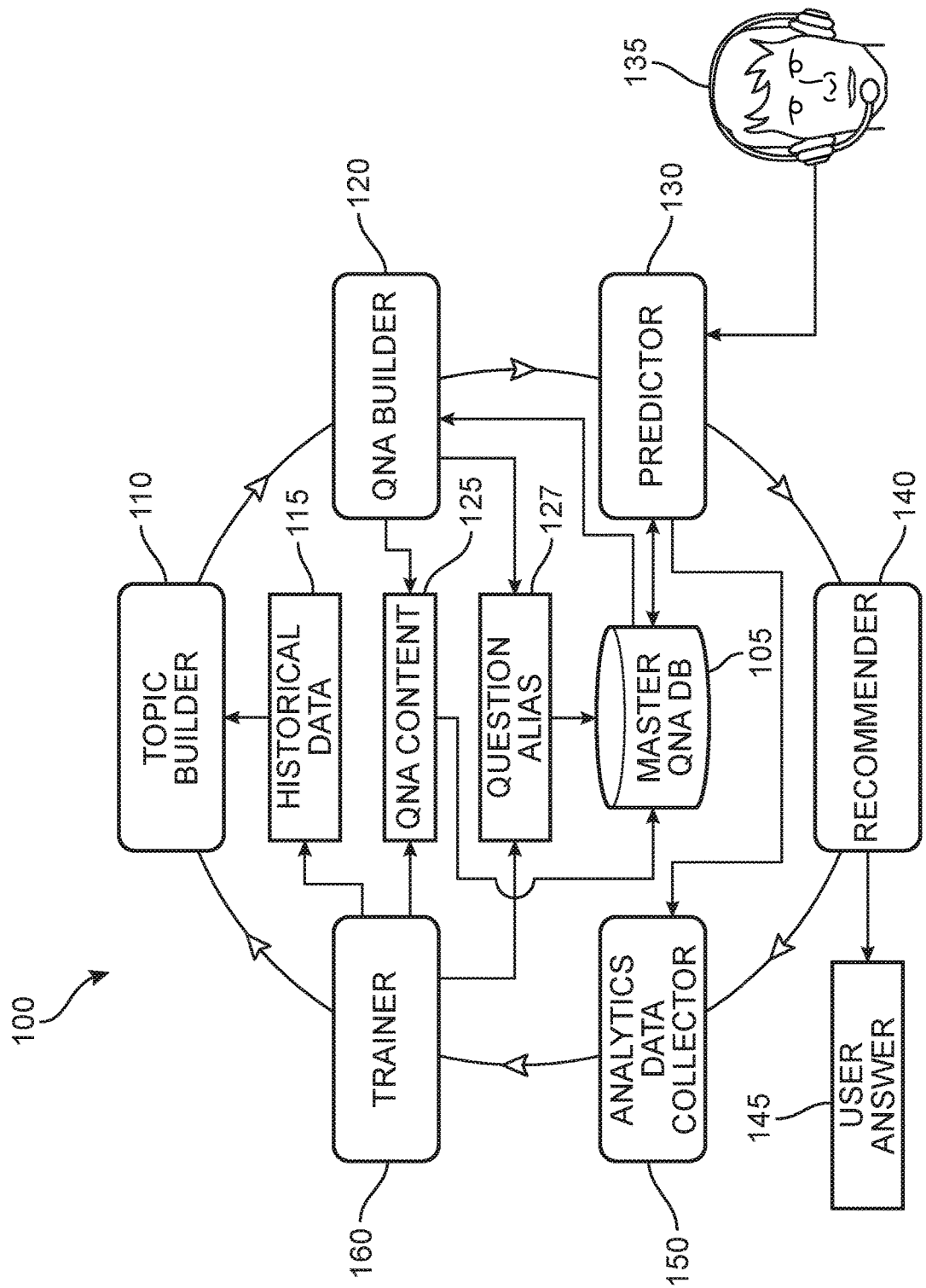
FIG. 1 is a schematic diagram depicting an embodiment of a question and answer engine.

In order to introduce the reader to some of the proposed embodiments, FIG. 1 illustrates a schematic example of a question and answer engine 100, also referred to as an "engine", or a "QNA engine", where the term QNA refers to the phrase "question and answer". The QNA engine 100 includes a topic builder 110, a QNA builder 120, a predictor 130, a recommender 140, an analytic data collector 150, and a trainer 160. The topic builder 110 uses an input of a set of historical data 115 to create the QNA builder 120 which updates a QNA content list ("recommender content") 125 for a master QNA database 105, which informs the predictor 130 which uses user utterances 135 to construct a recommendation using recommender 140. In some cases, the user can be given the answer and recommender content 125 from the master question and answer database 105 as a user's answer 145. The results of the recommender 140 and the predictor 130 can then be fed into the analytic data collector 150, which in turn is used by the trainer 160 which updates the topic builder 110, the QNA content list 125, the question alias list 127, and the historical data 115.

Figure 2:
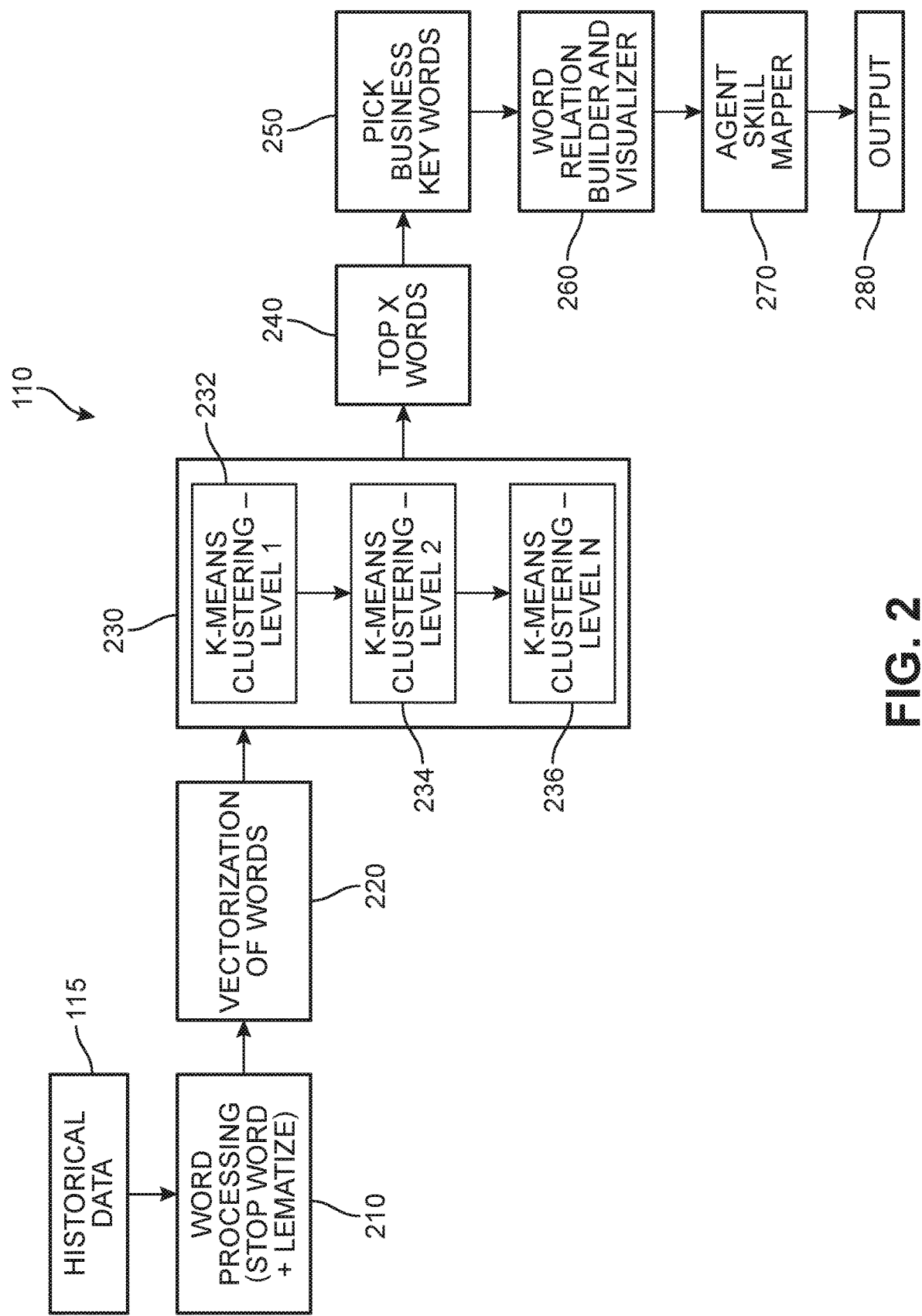
FIG. 2 is a schematic flow diagram depicting an embodiment of a topic builder architecture and process.

Additional details regarding the proposed engine 100 are now provided with reference to FIGS. 2-8. In FIG. 2, a flow diagram presenting an embodiment of the topic builder 110 is shown. In a first stage 210, historical data 115, which includes a historical utterance list, is received by a word processing module for implementation of a stop word and/or lemmatization linguistic analysis. Thus, in some embodiments, semantically 'useless' or meaningless words in the historical data 115 ("stop words") such as "the", "a", "an", "in") can be ignored, filtered out, and/or removed at this stage, improving the indexing of entries for searching and the retrieving of them as the result of a search query.

Furthermore, filtering may be used with or without lemmatization to identify compound words and phrases to be treated as individual words.

In addition, in some implementations, those terms that can encompass or refer to a more basic citation form of a word for the purposes of language or dictionary entries can be made generic via lemmatization. The form that will be utilized will depend greatly on the specifics of the language that was used as well as the type of text in question. Typically, such lemmas reflect a word's most morphologically simple form, from which other related words extending from this form can be derived. In some implementations, the word processing module can be configured to transform the received plurality of terms as identified in the historical data 115 to the version of the word that would appear at the head of a dictionary entry for the word. In other words, lemmatizing can allow a term to take on its broadest expression, and ensure all variations of the term can be matched or detected during the search.

In a second stage 220, the words produced and/or kept following the lemmatization and/or stop word filtration of the historical data 115 can be vectorized. For example, a vectorization module can perform an extraction of information from the collection of words and associate or assign each word to a vector. This vector value can be computed based at least in part on the word's context. Referring to a third stage 230, in some embodiments, the topic builder 110 can implement a clustering module for multilevel clustering to coordinate the vectorized historical data into multiple levels of topics and subtopics. These topics may be defined and differentiated by individual words, while the subtopics may use relationships between words. The clustering may apply k-means clustering at multiple levels with the vectorized words. The clustering may build a list of the most commonly used words, as well as a pre-identified list of business key words. Another layer of clustering may use the relationship between words to further define and differentiate subtopics. Thus, at a first clustering level 232, the top-most or broadest topics are categorized. A second clustering level 234 segments each topic into a set of subtopics, and a third clustering level 236 can further classify the words or phrases in each subtopic to a plurality of subclasses.

In different embodiments, sub-builders associated with the clustering module may be used to build the keyword lists, common word lists, and relationship lists. The common words list may include a preset number of words to track, such as a top 10 words, top 20 words, top 100 words, or more, as represented by a fourth stage 240. The common words list may also have a variable number based on thresholds of occurrence, for example accounting for stop words. In addition, in some optional embodiments, specific keywords may be selected from the top words for a particular purpose. For example, in a fifth stage 250, business keywords can be selected, may include business-related words such as 'billing' or 'service' or 'account', which can be identified based on an end-user's pre-selected list. Furthermore, in a sixth stage 260 the word relationship list may use a sub-builder with a visualizer to create a relationship list. The resulting topics and subtopics and subclasses may also be known as categories and subcategories.

In different embodiments, the topic builder 110 can further associate the resultant categories and/or subcategories with specific agent skills ("skill mapping") in a seventh stage 270, such that word groupings and historical utterances may be linked to a particular skill. These skills can be linked to human agents who are identified as having one or more of these specific skills for later reference. For example, one or more topics and subtopics can be linked to one or more skills such as financial planning and budget management, people management, strong communication (verbal, presentational, written), business analysis, business management, relationship management, organizational skills, leadership and motivational skills, technical skills, software skills, account security, customer service, retail and sales, account changes, etc. This type of mapping can enable the engine to readily identify an appropriate human agent in the organization who can provide the answer, response, or other dialogue or support that is best suited to the type of question (s), issues, or requests being posed by the end-user and directly route the end-user to a communication queue to speak or interact with the selected human agent. Thus, the proposed system can integrate the services of virtual agents and human agents and allow virtual chatbots to work seamlessly with human agents, such that the chatbot can 'hand-off' the conversation with a customer when appropriate. For example, when the chatbot is unable to answer the customer's question or address the issue or request, it can trigger an automatic and immediate redirection of the customer to a human agent with the necessary mapped skill based on the category and subcategory of the customer's utterance(s).

Figure 3:
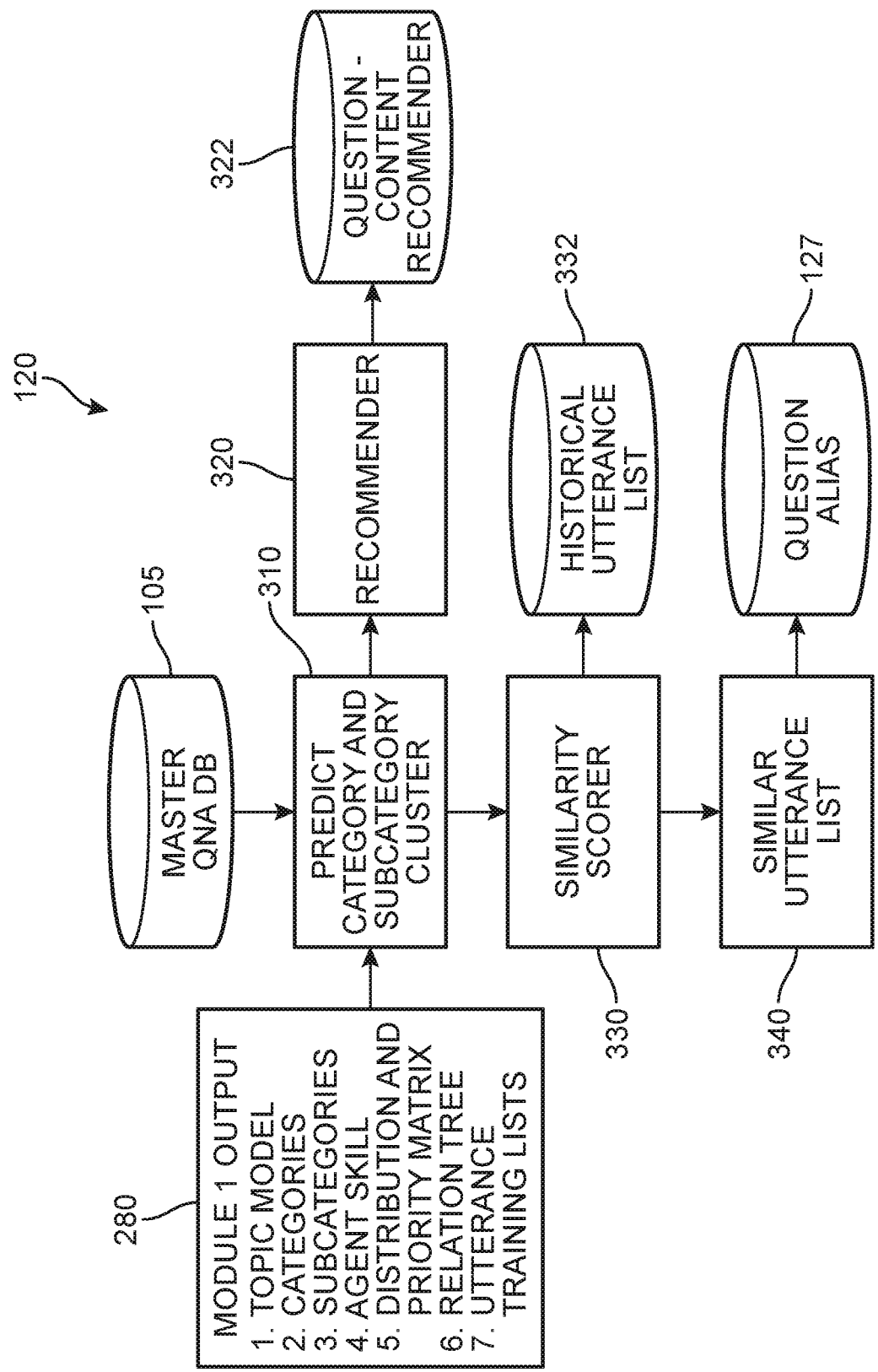
FIG. 3 is a schematic flow diagram depicting an embodiment of a question and answer architecture and process.

An output 280 comprising a far more structured set of data can thereby be produced by the topic builder 110. Referring now to FIG. 3, this output 280 can be seen to include several layers of data. In some embodiments, a distribution and priority matrix may be further created to help sort between topics and subtopics (or categories and subcategories), assigning priorities to the words. A relation tree may be further created to include the relationship list data. The agent skill mapped words may also be included. Finally, an utterance training list may have been created using the topic builder. The topic builder may output separate packages for the topic cluster and the subtopic cluster, including an additional graphical output for user purposes.

As shown in FIG. 3, the results of the topic builder may then feed into the Question and Answer builder ("QNA builder") 120. The QNA builder 120 receives output 280 of the topic builder and, in combination with data retrieved from the master question and answer database ("master QNA DB") 105. The data from the master question and answer database 105 is sorted into the appropriate topics and subtopics using the output 280 including clusters and relationship lists of the topic builder in a first stage 310. The sorted data is then fed to a recommender module (in a second stage 320) and also a similarity scorer module (in a third stage 330). In some embodiments, the recommender module can feed into a set of question-content recommendation lists. The lists are stored by a question-content recommender module 322 which makes use of QNA content 125 (see FIG. 1), and can be used to dynamically recommend and/or specify the answer for a given question. This recommendation can also be transmitted back to update the master question and answer database 105 for subsequent iterations in some embodiments.

Figure 4:
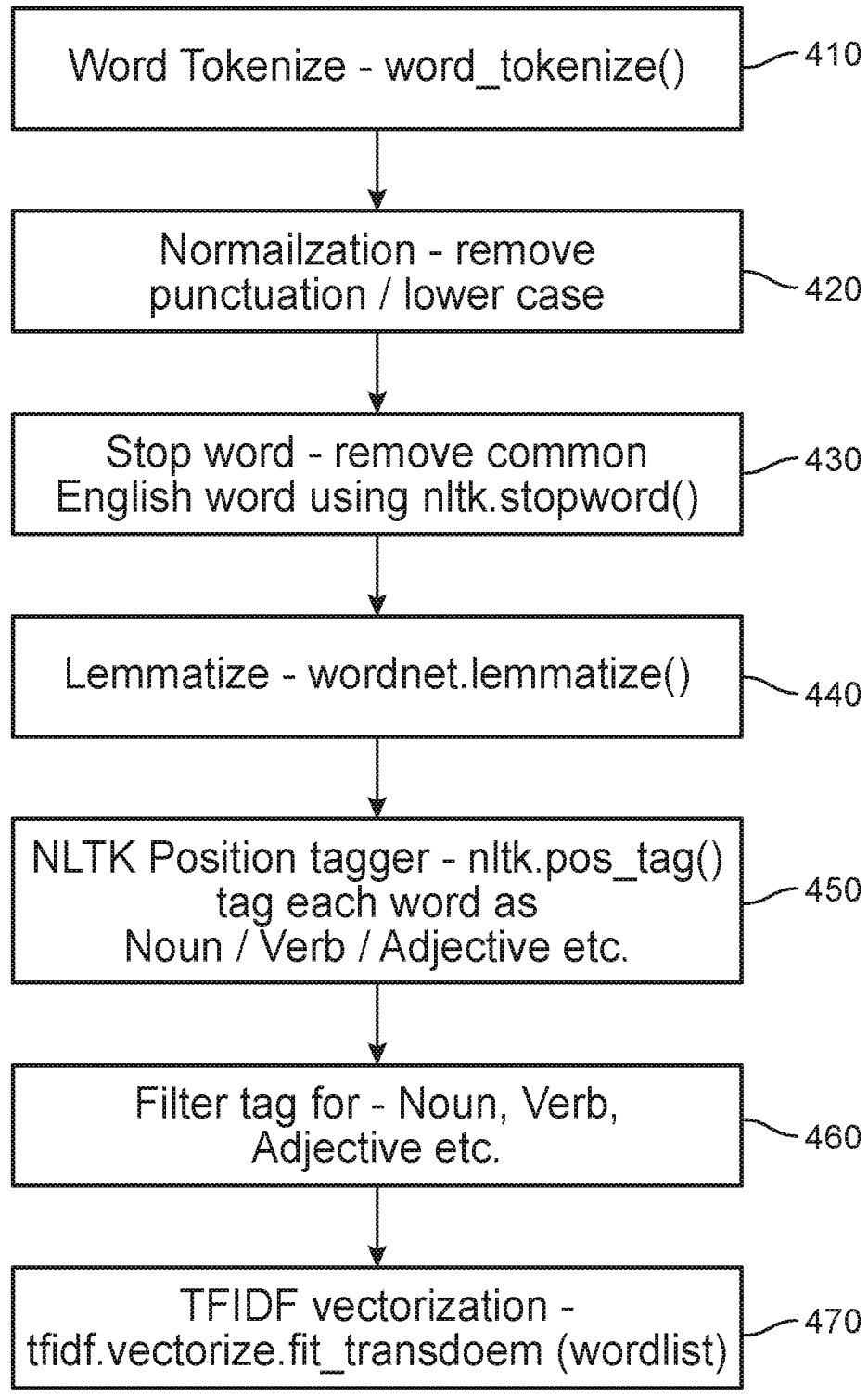
FIG. 4 is a schematic flow diagram depicting an embodiment of a similarity scoring architecture and process.

In different embodiments, the similarity scorer module takes the sorted topics and subtopics and consults the utterance lists (e.g., from the output 280) to build a similar utterance list that can be conveyed back to a historical utterance list 332, for example via a multi-step analysis (see FIG. 4). The similar utterance list is then used to create the question alias list 127 for the question-content recommendations 125 to further update the master question and answer database 105. Thus, the question-content recommendations 125 may be updated in the master question and answer database 105, while the question alias list 127 provides an updated list of known aliases to questions, which can be used to update the master QNA DB 105.

Referring now to FIG. 4, in some embodiments, a similarity scorer module may implement a multi-step analysis. In a first step 410, the words may be tokenized. The resulting tokenized words may be normalized to remove punctuation and/or capitalization in a second step 420. The normalized words may then undergo a stop word process in a third step 430 removing a list of known common words. For example, in English, words such as 'the', 'who', and 'what' are common words removed during a stop word process. The resulting term(s) may be lemmatized to identify compound words and phrases in a fourth step 440. A position tagger, for example by a natural language toolkit such as NLTK, may tag each word as a noun, verb, adjective, etc., according to the part of speech each word belongs to in a fifth step 450. These position tags may then be associated with or assigned a filter tag to separate the nouns, verbs, and adjectives, etc. in a sixth step 460. Finally, in a seventh step 470, term frequency-inverse document frequency, or TF-IDF, vectorization is performed for weighting. In some embodiments, cosine vector scoring may then be used with a set threshold to determine similarity.

One example of a QNA builder operation will be described for purposes of illustration. A sample question may be submitted by a customer, such as "How do I switch to the easy-online rate?" This question will be associated with a predicted category, sub-category, and class: Rate-Change-Question. The similarity scorer can apply a Cosine Vector Scorer, and a list of similar questions from the historical data set generated. This can be used to update the question alias list. The category and subcategory keywords can then be provided to the recommender module. Such keywords can include, for purposes of this example, easy online rate switch like blue exclusive change want renewal, leading to a recommender output comprising a document list, a video list, and/or a list related to the keywords identified.

As noted above with respect to FIG. 1, new answers produced by the QNA builder 120 are analyzed with predictor 130. An example of an operation of a prediction is depicted with reference to FIGS. 5A and 5B. In a first step 510 shown in FIG. 5A, a user utterance is typed or otherwise inputted into the system. A second step 520 involves the implementation of a cluster prediction or predictive clustering model, which contains elements of both predictive modelling and clustering. In predictive clustering, homogeneity may be considered along with the target variables and the attributes. Also, symbolic descriptions of the learned clusters can be generated in the forms of trees and rules. Clusters of examples that are similar to each other (and dissimilar to examples in other clusters) are identified and a predictive model is used to associate a target variable for each cluster.

The output of the cluster prediction is fed into a sentiment classifier in a third step 530. The sentiment classifier is configured to determine which category the user utterance(s) belongs in. The sentiment classifier may include a deep neural network (DNN) classifier in some embodiments. Using the results of sentiment classification, the user utterance(s) is directed to the appropriate system. For example, the sentiment classifier may determine if the user utterance is an issue, a request, or a question. In cases where the classifier determines the user utterance is an issue or request (a fourth step 540) such requests and/or issues may be forwarded to a human agent based on the identified topic and subtopic of their utterance in a fifth step 550. The human agent can be associated with one or more specific skills that are relevant or necessary to address the identified topic and subtopic. As an example, the sentiment classifier will classify a user utterance such as "my bill is too high" as an issue, and then identify the topic as billing and subtopic as pricing, allowing the customer to be automatically and expediently routed to a customer service agent with the skills for handling such an issue. Similarly, an utterance such as "my service is out" will be classified by the sentiment classifier as an issue, and the system will route the customer—based on the topic of service and subtopic of outage—to a technical support agent. In addition, the sentiment classifier can also identify question-based utterances (a sixth step 560) such as "how do I pay my bill?", and provide an appropriate response through a process that is described below with reference to FIG. 5B.

Figure 5A:
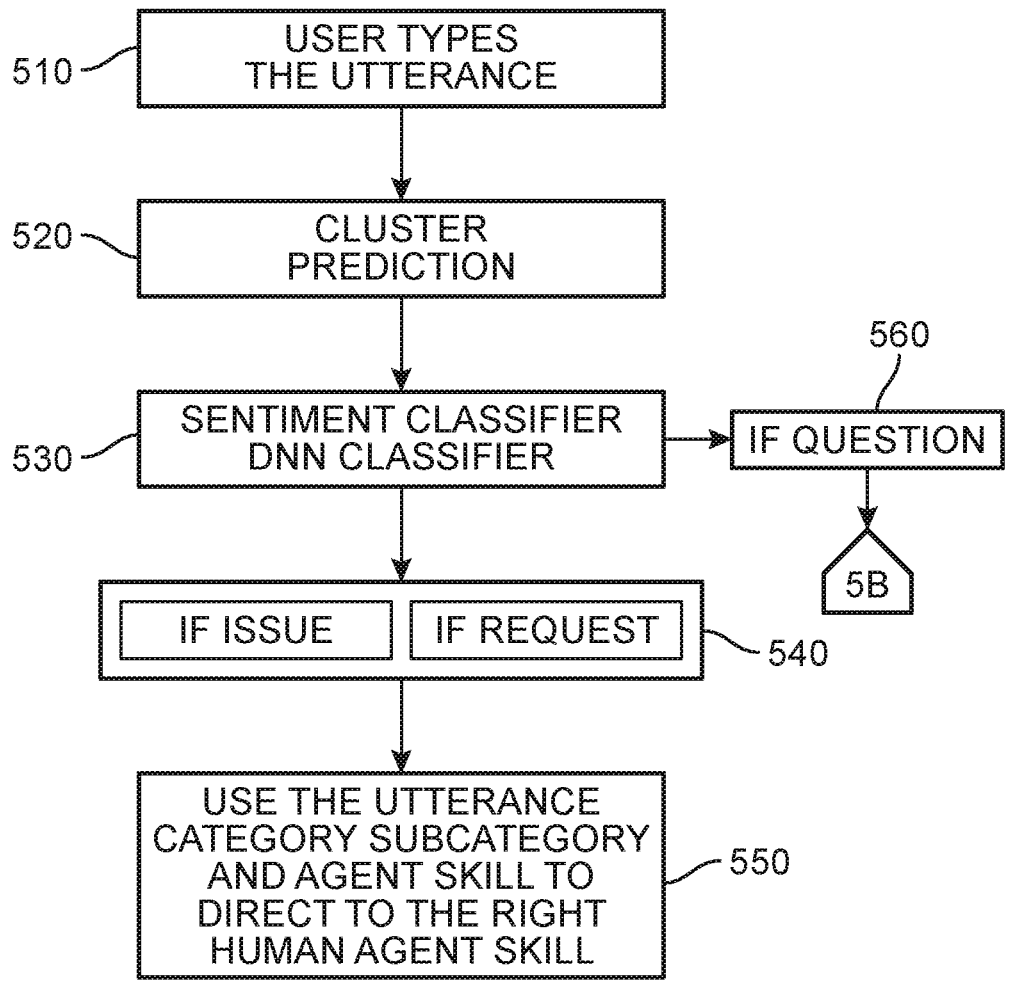
FIGS. 5A and 5B are a set of flow diagrams depicting an embodiment of a prediction generation architecture and process.
Figure 5B:
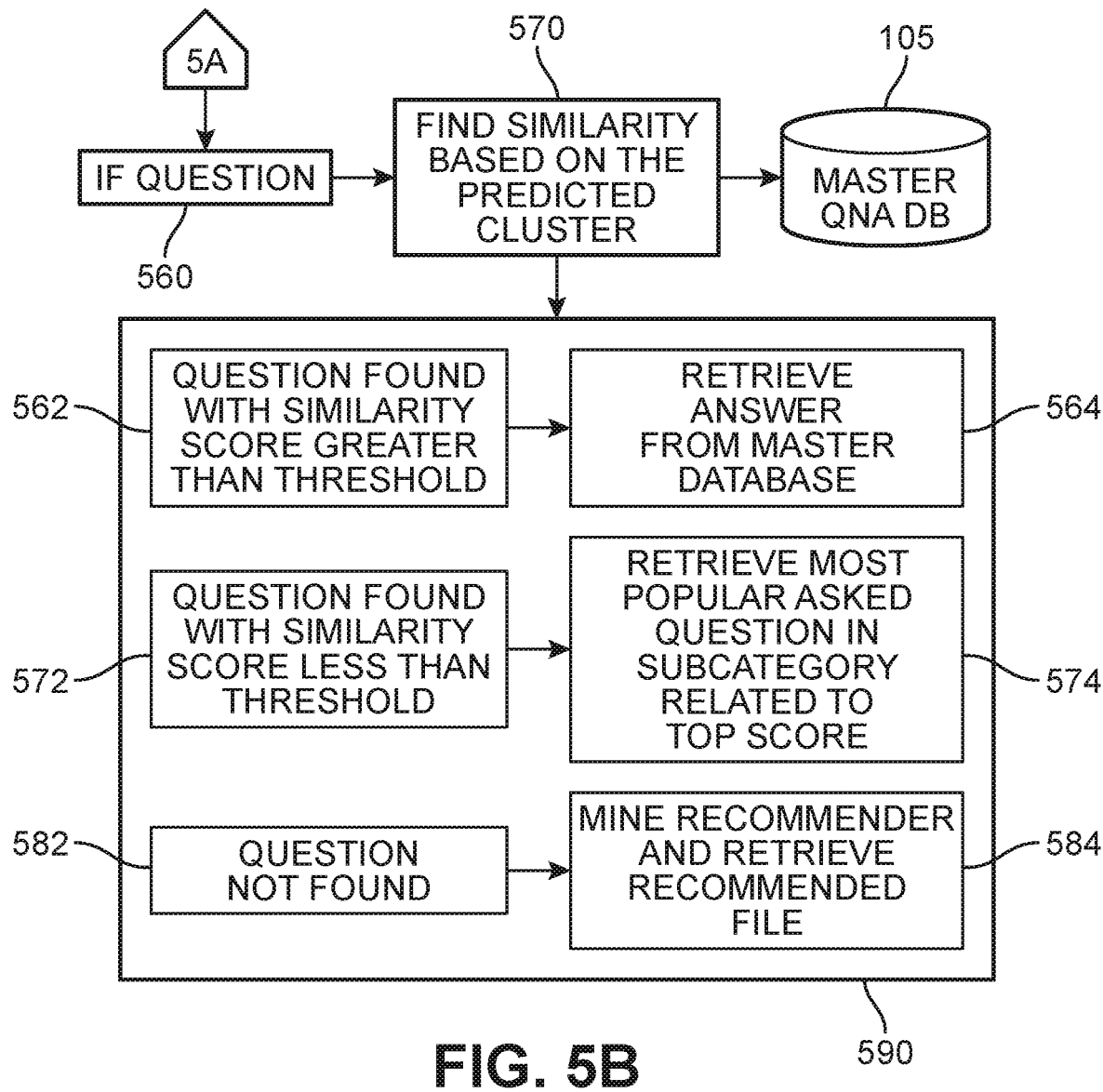

FIG. 5B can be understood to depict a continuation of the diagram of FIG. 5A. In FIG. 5B, it can be seen that in some embodiments, when the sentiment classifier detects or determines that a user's utterance includes a question (sixth step 560), the user's utterance can be compared to questions stored in the master question and answer database 105. This process can involve the use of a cluster predictor in a seventh step 570 to narrow the search to a given topic or subtopic that had been identified within the user's utterance. The user's utterance may be further processed by the similarity scorer and a similarity score assigned, as represented by a similarity scoring module 590 (using the same similarity scorer described above with the QNA builder 120). As shown in FIG. 5B, if a selected score threshold is met or exceeded at step 562, the answer is retrieved at step 564 from the master question and answer database 105 and provided to the customer as the answer. If instead the selected score threshold is not met at step 572, but the category and subcategory are identified, the most popular or frequently asked questions to the subcategory may be given in response at step 574.

If on the other hand the user's question and associated keywords are not found within the categories or subcategories (step 582), the user's utterance may be fed to a recommender in step 584. In different embodiments, a recommender may use the similarity scoring module to identify the closest match for the category and the subcategory of the user's question. In addition, in some embodiments, an n-gram model may be also used to frame the search string. An n-gram based keyword builder will create different combinations of keywords sets for submission to the recommender. Once the category and subcategory are identified by the recommender, the most popular and/or most frequently asked questions and corresponding answers in the category and subcategory are given to the user as a user's answer.

Figure 6A:
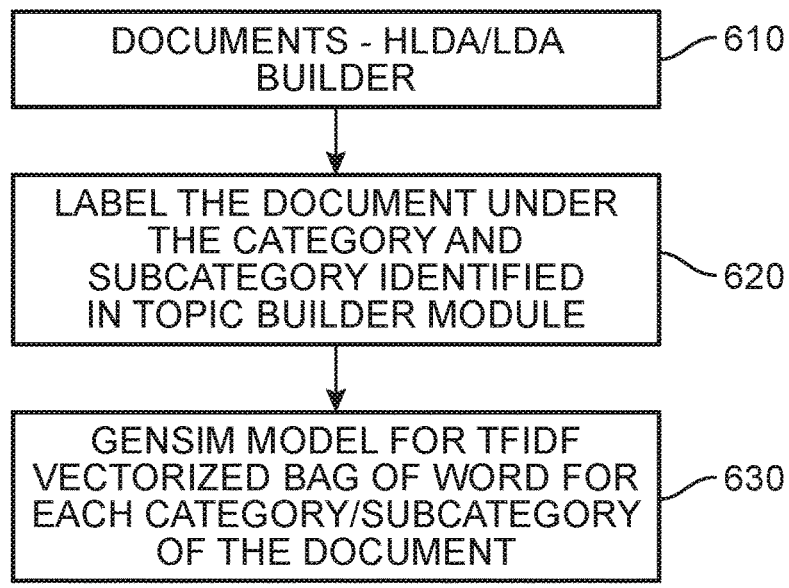
FIGS. 6A and 6B are a set of flow diagrams depicting an embodiment of a recommendation system and process.
Figure 6B:
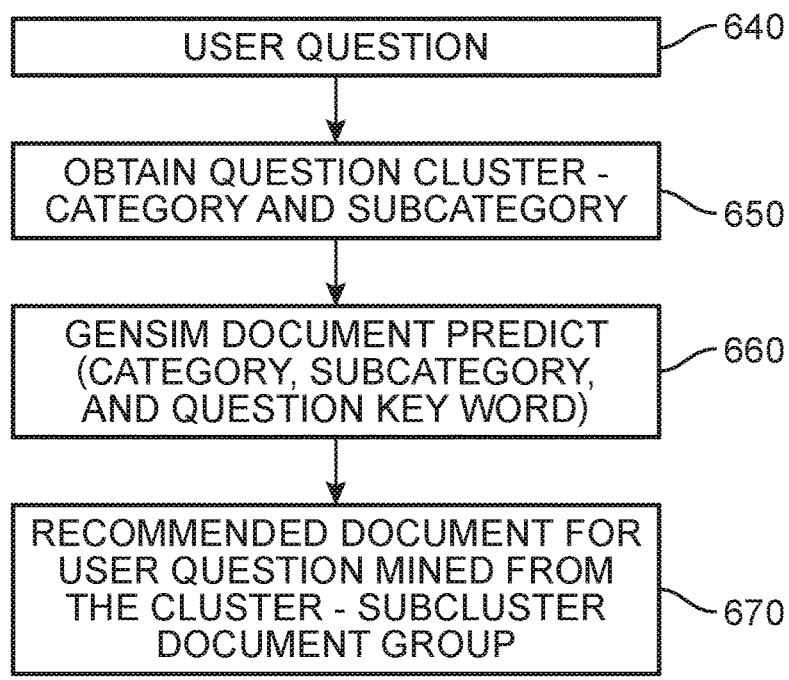

Referring to FIGS. 6A and 6B, it can be appreciated that in some embodiments, the recommender can provide specific citations, documents, files, media, electronic content, or other resources in conjunction with the user's answer based on automated labeling of these resources. In FIG. 6A, a document labeling and generation process is presented based on a gensim similarity model. However, it should be understood that in other embodiments, other topic modeling and natural language processing techniques may be implemented. In a first step 610, documents are identified via multi-document summarization (MDS) technology configured to generate a brief and concise summary that retaining the main characteristic of the original set of documents, such as but not limited to an HLDA/LDA builder. An LDA (Latent Dirichlet Allocation) model is a representative and widespread topic three-level hierarchical Bayesian model, in which each item of a collection is modeled as a finite mixture over an underlying set of topics. Each topic is modeled as a probability distribution over words. The Hierarchical Latent Dirichlet Allocation (hLDA) model is an example of an unsupervised machine learning method that is a generalization of LDA. The hLDA model can be used to successfully extract the potential connection between the levels of topics, and can automatically determine the number of topics. In a second step 620, the document(s) is labeled under the category and subcategory identified by the topic builder module. In a third step 630, a method of representing these word strings as vectors will be applied by use of a natural language processing technique or model, such as gensim modeling, bag-of-words, TF-IDF (term frequency-inverse document frequency), LSI (latent semantic indexing) and/or word2vec. This can be performed for each category and subcategory of the document. In addition, the model is dynamic and can be retrained over time as new documents or other electronic resources with category/subcategory labels are added to the resource library or folder.

In FIG. 6B, a process of implementing the recommender model is presented. In a first step 640, a user question is received. A cluster is determined for the question, including a category and subcategory, in a second step 650. A prediction model such as gensim will be used to identify or predict which resource (here, a document) matches or is best suited for the given category, subcategory, and/or question key word in a third step 660. Finally, in a fourth step 670, a document is selected and recommended for use in responding to the user's question, as mined from the cluster-subcluster document group.

Figure 7:
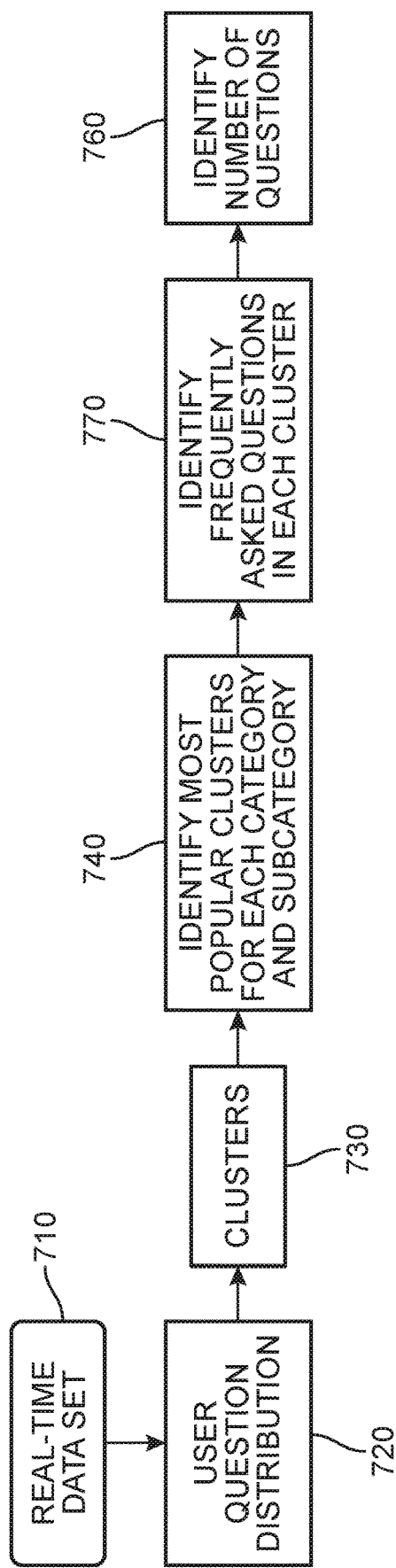
FIG. 7 is a schematic flow diagram depicting an embodiment of an analytical data collection system and process.

Referring next to FIG. 7, in different embodiments, the performance of both the predictor and the recommender may be analyzed using an analytic data collector. In some embodiments, the analytic data collector may continuously or substantially continuously collect real-time data ("data") 710 for analysis of each result of both the predictor 130 and the recommender 140. The data 710 may include a distribution 720 of user questions with respect to one or more clusters 730. This information can be used for identification 740 of the most popular clusters for each category and subcategory. In addition, frequently asked questions 750 for each cluster can be identified, and a running tally 760 reflecting the number of questions or frequency that a particular question or type of question has been asked can be identified (also referred to as a "question asked count") and stored and updated in the master QNA DB. The question asked count can be used by the prediction module when the similarity score is below a particular threshold. In one embodiment, this collection and analysis may be performed in real-time. In some embodiments, the distribution 720 may be computed based on the number of times the predictor and sentiment classifier module generate hits.

Figure 8:
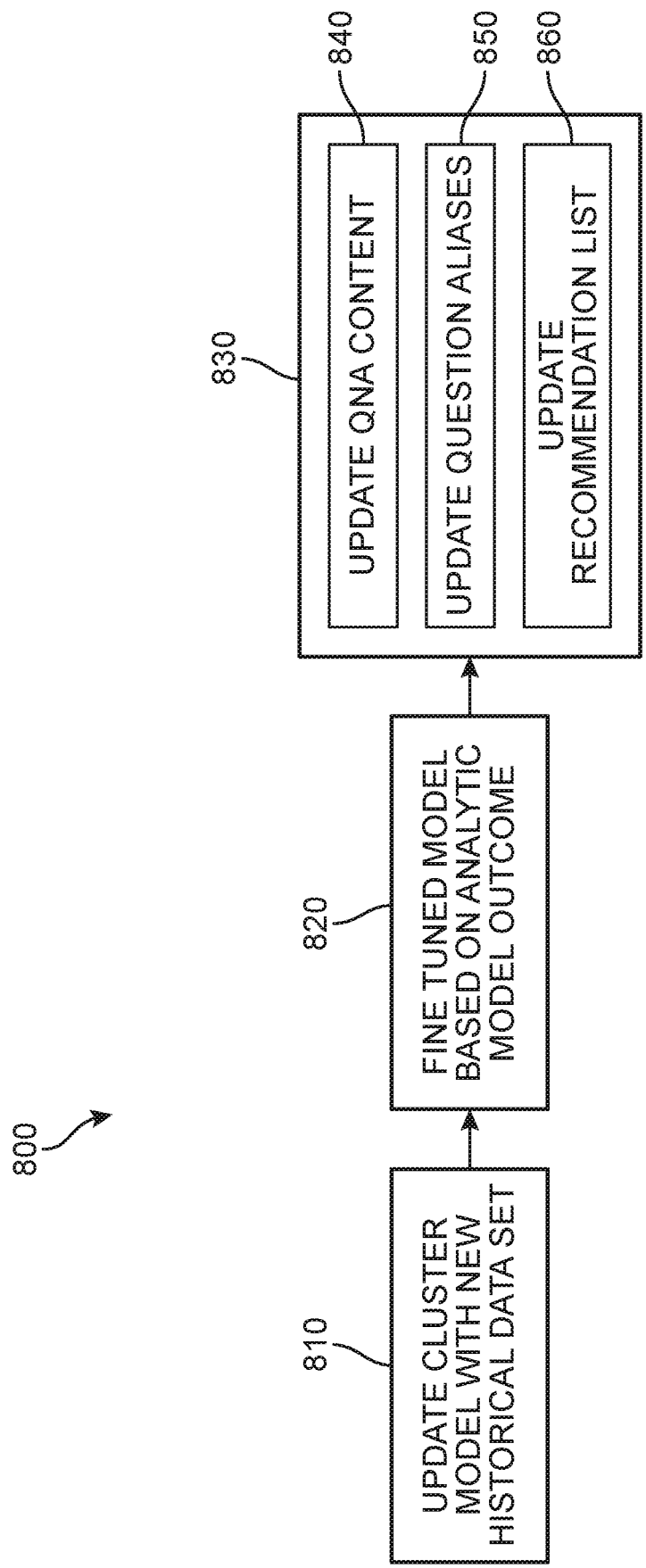
FIG. 8 is a schematic flow diagram depicting an embodiment of a training process.

In FIG. 8, an example of a training process 800 is presented. In different embodiments, the engine builder may use the analytic data collector to train the system. As noted above, the master question and answer database may be updated with the question asked count which in turn updates the predictor. The cluster model may, in turn, have the historical data updated with the results, as reflected by a first step 810. The model may be fine-tuned based on the analytic model outcome in a second step 820. The model can then be used to automatically refine and update specific categories of data 830, including but not limited to the results of the analytic data collector, the cluster module (identifying topics and subtopics), the master question and answer database (QNA content 840), the question alias list 850, and the question-content recommendations 860. Thus, an engine builder may automatically refine itself in real-time, and over many iterations.

It can be appreciated that in different embodiments, the engine builder described herein may be implemented as a system. The system may comprise a processor, memory, and storage for the engine builder. The system may further compose a network component, such as may be reached using a local area network, a wide area network, or a combination. The system may be implemented using in-house resources, such as a server on an internal network, a desktop application, or in-house cloud. In other embodiments, the system may be implemented using a remote server, or external cloud. In still further embodiments, the system may be implemented using a combination of in-house and external assets, with sensitive user data kept locally, while user utterances are submitted via an external chatbot program.

As a general matter, the proposed systems and techniques offer a wide array of advantages over previous question and answer engines. For example, with respect to historical data utilization for building topic trees, and aligning the question to topics and subtopics, conventional question and answer builders do not offer the option of clustering the historical logs into clusters of topics and subtopic and building relationships with the question bank. The proposed topic builder module is configured to generate multi-layered clusters from the historical data set and generate the corresponding topics and subtopics categories. In addition, every question in the question bank will be associated with topics and subtopics, and a relation tree will be created connecting topics and subtopics as well as a follow up question tree.

Similarly, while traditional question and answer builders do not offer the option of taking the historical chat utterances and automatically building the question alias, the proposed QNA Builder Module will generate all the alias for the question bank and automatically update the alias of a question, based on the automation of the training of question aliases. In addition, although conventional question and answer engines does not support document recommendation features, the proposed systems offer recommendation engines that can provide additional dynamic information to the question asked by the user by automated labeling of the document based on the classification of the document into the category and subcategory identified from the historical chat log. As a result, a gensim or other topic modeling approaches can be associated with each category of document and can be configured to locate the most relevant set of documents for the user's question.

Furthermore, while conventional natural language processing techniques rely on intent and entity-based pattern match or classifier to match the question to the questions in a question and answer bank, this type of approach is limiting, whereby as the number of question grows, intent mismatches also increase. Similarly, these techniques rely on a scoring based on the entire question bank rather than based on question topic relevance. In contrast, the proposed systems offer a predictor model that is configured to automatically predict the topic and subtopic of utterance entered by user, and classify the utterance as one or more of a Question, Issue, or Request (sentiment analysis). In cases where the utterance is classified as a question, a similar question can be detected from the question bank based on the topic and subtopic category. In cases where the utterance is not classified as a question, the recommender module can automatically generate a recommendation for a particular resource, such as a document, URL, video, etc.

In another example, conventional engines may include a recommender feature that send backs only a single intent and entity, which is not useful in determining the optimal or most helpful recommendation, as the search is based on multiple key words. However, the proposed systems offer an N-gram based key word builder that is configured to create a different combination of the key word set and pass it to recommender system for getting the optimal recommendation output, and also configuring this output in a QNA master table. Similarly, features of conventional engines such as QNA Building and Training are not customizable nor can they be automatically trained. In contrast, the proposed systems rely on models that are built 'in-house' using the historical chat logs and a base question table. Thus, clustering and classifier models can be readily customized with client specific data. Finally, while conventional question and answer builders do not automate the training of the question and answer bank after launch, and training must occur manually based on the chat logs, the proposed systems include an analytic data collector and trainer module, such that chat logs are analyzed automatically and fed back to the QNA bank to provide additional aliases for each question.

Figure 9:
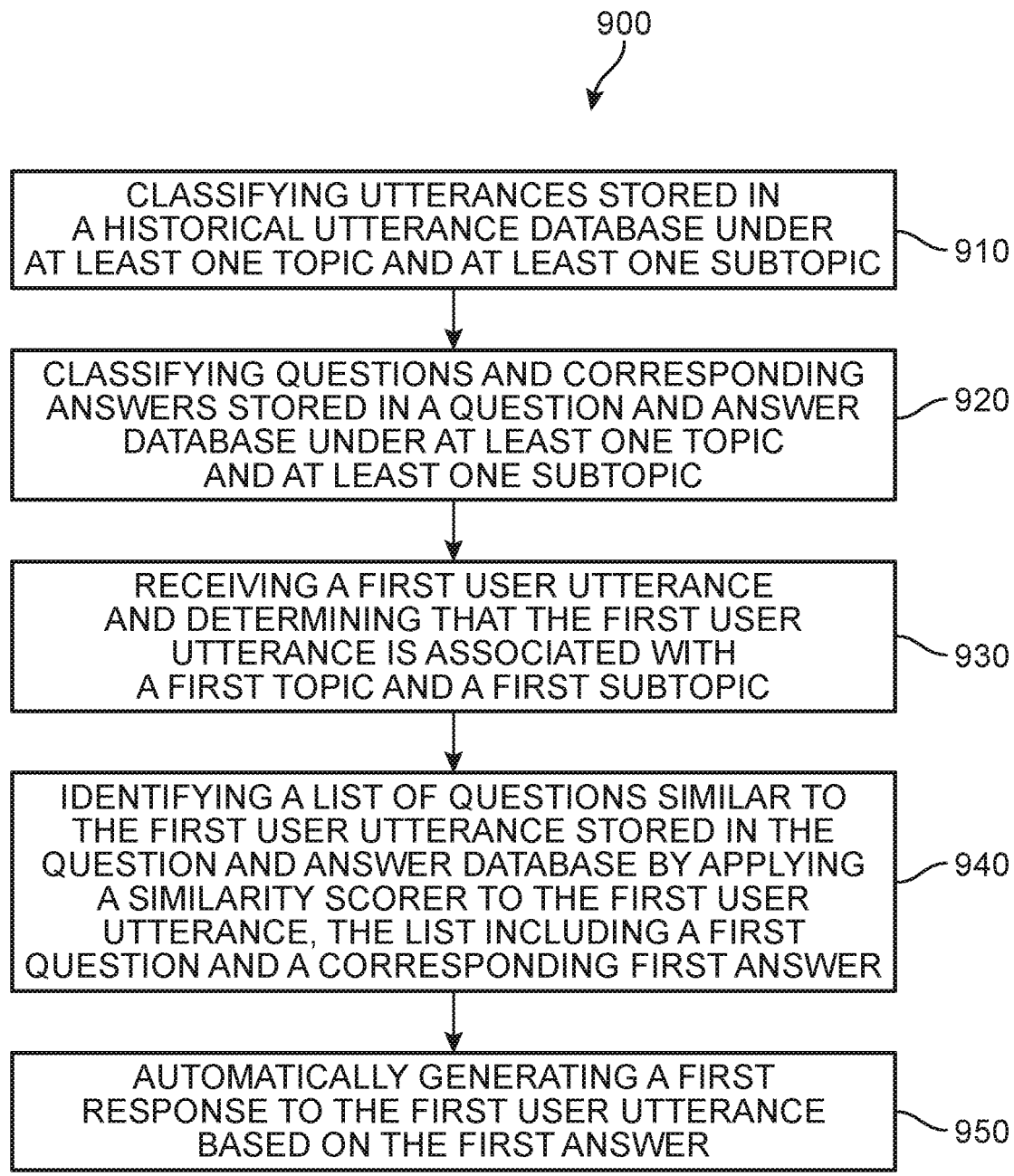
FIG. 9 is a flow chart presenting an embodiment of a method of training a question and answer chatbot agent.

FIG. 9 is a flow chart illustrating an embodiment of a method 900 of using a question and answer engine to automatically generate responses to an end-user. The method 900 includes a first step 910 of classifying each utterance stored in a historical utterance database under at least one topic and at least one subtopic and a second step 920 of classifying each of a plurality of questions and corresponding answers stored in a question and answer database under at least one topic and at least one subtopic. The method 900 also includes a third step 930 of receiving a first user utterance and determining that the first user utterance is associated with a first topic and a first subtopic. In addition, the method 900 includes a fourth step 940 of identifying a list of questions similar to the first user utterance stored in the question and answer database by applying a similarity scorer to the first user utterance, the list including a first question and a corresponding first answer, and a fifth step 950 of automatically generating a first response to the first user utterance based on the first answer.

In other embodiments, the method may include additional steps or aspects. In some embodiments, in cases where the first user utterance is classified as a question, the method can also include a step of generating a similarity score for the first user utterance in relation to the first question, where the similarity score is greater than a preselected threshold. In another example, classifying each utterance under at least one topic and at least one subtopic further comprises steps of filtering stop words from each utterance, lemmatizing each utterance, vectorizing each utterance, identifying keywords within each utterance, determining a relationship between keywords within each utterance, and identifying the at least one topic and the at least one subtopic for each utterance by clustering.

In some embodiments, applying the similarity scorer can further include steps of tokenizing the first user utterance to produce a tokenized utterance, normalizing the tokenized utterance to produce a normalized utterance, filtering stop words from the normalized utterance to produce a filtered utterance, lemmatizing the filtered utterance to produce a lemmatized utterance, position tagging the lemmatized utterance to identify the tag words, vectorizing the tag words, and scoring the vectorized tag words using cosine similarity. In another example, the method can also include receiving a second user utterance, and classifying the second user utterance as an issue, request, or question.

In cases where the second user utterance is classified as an issue or request, the method can also include steps of determining that the second user utterance is associated with a second topic and a second subtopic, and automatically routing the end-user to a human agent who is associated with one or more skills that are related to the second topic and second subtopic. In some other cases where the second user utterance is classified as a question, the method can also include steps of determining that the second user utterance is associated with a second topic and a second subtopic, applying the similarity scorer to the second user utterance and determining a similarity score for the second user utterance in relation to one or more questions classified under the second topic and second subtopic in the question and answer database, where the similarity score is less than a preselected threshold, retrieving, from the question and answer database, the most frequently asked question associated with the second subtopic and its corresponding second answer, and automatically generating a second response to the second user utterance based on the second answer.

In some embodiments where the second user utterance is classified as a question, the method can additionally include steps of determining that the second user utterance is associated with a second topic and a second subtopic, applying the similarity scorer to the second user utterance and determining the second user utterance is novel relative to the plurality of questions stored in the question and answer database, retrieving, from an electronic resource database, at least a first electronic resource labeled with the second topic and second subtopic, and automatically presenting the first electronic resource as a response to the second user utterance. Furthermore, in some examples, the first electronic resource is one of a document, URL, video, image, and tutorial.

In some other embodiments where the second user utterance is classified as a question, the method also includes determining that the second user utterance is associated with a second topic and a second subtopic, applying the similarity scorer to the second user utterance and determining the second user utterance is novel relative to the plurality of questions stored in the question and answer database, and automatically routing the end-user to a human agent who is associated with one or more skills that are related to the second topic and second subtopic.

In another example, upon classifying the user utterance as a question, the method can include using a question alias list to determine a question alias corresponding to the question, and responding to the user utterance with an answer that is within the five most popular answers within the topic and subtopic associated with the user utterance. In one embodiment, data from (1) determining the at least one topic and the at least one subtopic and (2) determining the closest match includes a distribution of questions asked, the most popular topic and subtopic corresponding to multiple user utterances, frequently asked questions among multiple user utterances, and the number of times user utterances correspond to a predetermined question alias.

The proposed QNA engines offers a mechanism by which a FAQ-chatbot can be trained both simply and effectively. The disclosed system is a generic and scalable solution to any FAQ chatbot types and provides a rigorous, broad question and answer database based on historical data analysis that is readily integrated to any bot framework or front-end and back-end systems. This type of architecture can be (a) used for QNA systems end to end; (b) used to build the QNA Content based on the historical data points; (c) integrated into Node JS/Webhook or any other bot framework; (d) scaled to create alternate to Api.ai/wit.ai and Microsoft Luis bot intent/entity identification; (e) used as a continuous machine learning script to train the bot for various failed user conversations with the bot; (f) used for automatic routing of users to the appropriate human agents' queue in a call center; (g) easily integrated into an existing bot frame work to improve the performance of the bot; and (f) used for providing a dynamic document recommendation engine. In addition, the proposed systems are configured to be open source, secure, cost-effective, easy to integrate, and scalable.

For purposes of this application, a virtual assistant or chatbot may also be referred to as a virtual assistant system, a digital assistant, a digital assistant system, a digital personal assistant, and/or an automated agent. As a general matter, such terms should be understood to encompass a processing environment that is adapted to utilize spoken cues from utterances spoken in session to influence a render state for an interface serving as an activity session assistant. Thus, some or all of the processing environment may be referred to as, included in, and/or include the virtual assistant. Furthermore, a virtual assistant and associated systems for communicating with a virtual assistant may include one or more user devices, such as a computer, a server, a database, and a network. For example, a virtual assistant running on a server could communicate with a user over a network. In some embodiments, the network may be a wide area network ("WAN"), e.g., the Internet. In other embodiments, the network may be a local area network ("LAN"). For example, in a more remote location far from a metropolitan area, the Internet may not be available. In yet other embodiments, the network may be a combination of a WAN and a LAN. In embodiments where a user talks to a virtual assistant using a phone (e,g., a landline or a cell phone), the communication may pass through a telecom network and/or a wide area network. In addition, one or more resources of a virtual assistant may be run on one or more servers. Each server may be a single computer, the partial computing resources of a single computer, a plurality of computers communicating with one another, or a network of remote servers (e.g., cloud). The one or more servers can house local databases and/or communicate with one or more external databases.

In different embodiments, the VA may be accessed via a user interface for the VA system. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e,g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment 222, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of using a question and answer engine to automatically generate responses to an end-user, the method comprising:
   classifying each utterance stored in a historical utterance database under at least one topic and at least one subtopic;
   feeding the at least one topic and at least one subtopic for each utterance to a predictive clustering model;
   classifying, via the predictive clustering model, each of a plurality of questions and corresponding answers stored in a question and answer database under at least one topic and at least one subtopic;
   feeding the at least one topic and at least one subtopic for each of the plurality of questions and answers to a recommender module;
   receiving a first user utterance and determining, via the recommender module, that the first user utterance is associated with a first topic and a first subtopic;
   identifying a list of related questions stored in the question and answer database that are also classified under the first topic and the first subtopic, the list of related questions including a first question, the first question having a corresponding first answer;
   identifying, from the related questions, the first question as being similar to the first user utterance by applying a similarity scorer to the first user utterance; and
   automatically generating a first response to the first user utterance based on the first answer.

2. The method of claim 1, wherein the first user utterance is categorized as a question, and the method further comprises generating a similarity score for the first user utterance in relation to the first question, and the similarity score is greater than a preselected threshold.

3. The method of claim 1, wherein classifying each utterance stored in the historical database under at least one topic and at least one subtopic further comprises:
   filtering stop words from each utterance;
   lemmatizing each utterance;
   vectorizing each utterance;
   identifying keywords within each utterance;
   determining a relationship between keywords within each utterance; and
   identifying the at least one topic and the at least one subtopic for each utterance by clustering.

4. The method of claim 1, wherein applying the similarity scorer to the first user utterance comprises:
   tokenizing the first user utterance to produce a tokenized utterance;
   normalizing the tokenized utterance to produce a normalized utterance;
   filtering stop words from the normalized utterance to produce a filtered utterance;
   lemmatizing the filtered utterance to produce a lemmatized utterance;
   position tagging the lemmatized utterance to identify tag words;
   vectorizing the tag words; and
   scoring the vectorized tag words using cosine similarity.

5. The method of claim 1, further comprising:
   receiving a second user utterance;
   passing the second user utterance to the recommender module to obtain a second topic and second subtopic associated with the second user utterance; and
   categorizing the second user utterance as an issue, request, or question.

6. The method of claim 5, wherein the second user utterance is categorized as an issue or request, and the method further comprises:
   mapping each topic to a specific agent skill, the specific agent skill being one of financial planning, budget management, people management, communication, business analysis, business management, relationship management, organization, leadership, technical, software, account security, customer service, and retail and sales skills; and
   automatically routing the end-user to a human agent who is associated with a skill mapped to the second topic.

7. The method of claim 5, wherein the second user utterance is categorized as a question, and the method further comprises:
   applying the similarity scorer to the second user utterance and determining a similarity score for the second user utterance in relation to one or more questions classified under the second topic and second subtopic in the question and answer database, where the similarity score is less than a preselected threshold;
   retrieving, from the question and answer database, the most frequently asked question associated with the second subtopic and its corresponding second answer; and
   automatically generating a second response to the second user utterance based on the second answer.

8. The method of claim 5, wherein the second user utterance is categorized as a question, and the method further comprises:
   applying the similarity scorer to the second user utterance and determining the second user utterance is novel relative to the plurality of questions stored in the question and answer database;
   retrieving, from an electronic resource database, at least a first electronic resource labeled with the second topic and second subtopic; and
   automatically presenting the first electronic resource as a response to the second user utterance.

9. The method of claim 5, wherein the second user utterance is categorized as a question, and the method further comprises:
   applying the similarity scorer to the second user utterance and determining the second user utterance is novel relative to the plurality of questions stored in the question and answer database; and
   automatically routing the end-user to a human agent who is associated with one or more skills that are mapped to the second topic and second subtopic.

10. The method of claim 8, wherein the second user utterance is categorized as a question, and the method further comprises:
    generating a similarity score for the second user utterance in relation to the first question, and the similarity score is greater than a preselected threshold.

11. A system for using a question and answer engine to automatically generate responses to an end-user, the system comprising:
  a processor;
  machine-readable media including instructions which, when executed by the processor, cause the processor to:
    classify each utterance stored in a historical utterance database under at least one topic and at least one subtopic;
    feed the at least one topic and at least one subtopic for each utterance to a predictive clustering model;
    classify, via the predictive clustering model, each of a plurality of questions and corresponding answers stored in a question and answer database under at least one topic and at least one subtopic;
    feed the at least one topic and at least one subtopic for each of the plurality of questions and answers to a recommender module;
    receive a first user utterance and determining, via the recommender module, that the first user utterance is associated with a first topic and a first subtopic;
    identify a list of related questions stored in the question and answer database that are also classified under the first topic and the first subtopic, the list of related questions including a first question, the first question having a corresponding first answer;
    identify, from the related questions, the first question as being similar to the first user utterance by applying a similarity scorer to the first user utterance; and
    automatically generate a first response to the first user utterance based on the first answer.

12. The system of claim 11, wherein the first user utterance is categorized as a question, and the instructions further cause the processor to generate a similarity score for the first user utterance in relation to the first question, and the similarity score is greater than a preselected threshold.

13. The system of claim 11, wherein classifying each utterance stored in the historical database further cause the processor to:
  filter stop words from each utterance;
  lemmatize each utterance;
  vectorize each utterance;
  identify keywords within each utterance;
  determine a relationship between keywords within each utterance; and
  identify the at least one topic and the at least one subtopic for each utterance by clustering.

14. The system of claim 11, wherein applying the similarity scorer to the first user utterance further cause the processor to:
  tokenize the first user utterance to produce a tokenized utterance;
  normalize the tokenized utterance to produce a normalized utterance;
  filter stop words from the normalized utterance to produce a filtered utterance;
  lemmatize the filtered utterance to produce a lemmatized utterance;
  position tag the lemmatized utterance to identify tag words;
  vectorize the tag words; and
  score the vectorized tag words using cosine similarity.

15. The system of claim 11, wherein the instructions further cause the processor to:
  receive a second user utterance;
  pass the second user utterance to the recommender module to obtain a second topic and second subtopic associated with the second user utterance; and
  categorize the second user utterance as an issue, request, or question.

16. The system of claim 15, wherein the second user utterance is categorized as an issue or request, and the instructions further cause the processor to:
  map each topic to a specific agent skill, the specific agent skill being one of financial planning, budget management, people management, communication, business analysis, business management, relationship management, organization, leadership, technical, software, account security, customer service, and retail and sales skills; and
  automatically route the end-user to a human agent who is associated with a skill mapped to the second topic.

17. The system of claim 15, wherein the second user utterance is categorized as a question, and the instructions further cause the processor to:
  apply the similarity scorer to the second user utterance and determining a similarity score for the second user utterance in relation to one or more questions classified under the second topic and second subtopic in the question and answer database, where the similarity score is less than a preselected threshold;
  retrieve, from the question and answer database, the most frequently asked question associated with the second subtopic and its corresponding second answer; and
  automatically generate a second response to the second user utterance based on the second answer.

18. The system of claim 15, wherein the second user utterance is categorized as a question, and the instructions further cause the processor to:
  apply the similarity scorer to the second user utterance and determining the second user utterance is novel relative to the plurality of questions stored in the question and answer database;
  retrieve, from an electronic resource database, at least a first electronic resource labeled with the second topic and second subtopic; and
  automatically present the first electronic resource as a response to the second user utterance.

19. A non-transitory computer-readable medium storing software comprising instructions executable by one or more processors which, upon such execution, cause the one or more processors to:
  classify each utterance stored in a historical utterance database under at least one topic and at least one subtopic;
  feed the at least one topic and at least one subtopic for each utterance to a predictive clustering model;
  classify, via the predictive clustering model, each of a plurality of questions and corresponding answers stored in a question and answer database under at least one topic and at least one subtopic;
  feed the at least one topic and at least one subtopic for each of the plurality of questions and answers to a recommender module;
  receive a first user utterance and determining, via the recommender module, that the first user utterance is associated with a first topic and a first subtopic;
  identify a list of related questions stored in the question and answer database that are also classified under the first topic and the first subtopic, the list of related questions including a first question, the first question having a corresponding first answer;

identify, from the related questions, the first question as being similar to the first user utterance by applying a similarity scorer to the first user utterance; and automatically generate a first response to the first user utterance based on the first answer.

20. The non-transitory computer-readable medium storing software of claim 19, wherein classifying each utterance stored in the historical database further cause the one or more processors to:

filter stop words from each utterance;
lemmatize each utterance;
vectorize each utterance;
identify keywords within each utterance;
determine a relationship between keywords within each utterance; and
identify the at least one topic and the at least one subtopic for each utterance by clustering.

* * * * *